United States Patent
Tokuhisa et al.

(10) Patent No.: US 9,172,204 B2
(45) Date of Patent: Oct. 27, 2015

(54) METHOD FOR ADJUSTING ELECTRO-OPTIC MODULATOR IN LASER DEVICE, AND LASER DEVICE

(75) Inventors: Akira Tokuhisa, Tokyo (JP); Yasutoshi Takada, Tokyo (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 13/981,187

(22) PCT Filed: Feb. 10, 2012

(86) PCT No.: PCT/JP2012/053134
§ 371 (c)(1),
(2), (4) Date: Oct. 10, 2013

(87) PCT Pub. No.: WO2012/108530
PCT Pub. Date: Aug. 16, 2012

(65) Prior Publication Data
US 2014/0036944 A1  Feb. 6, 2014

(30) Foreign Application Priority Data
Feb. 10, 2011 (JP) .................... 2011-027884

(51) Int. Cl.
*H01S 3/10* (2006.01)
*G02F 1/37* (2006.01)
(Continued)

(52) U.S. Cl.
CPC .............. *H01S 3/10015* (2013.01); *G02F 1/37* (2013.01); *H01S 3/06754* (2013.01); *H01S 3/1301* (2013.01); *H01S 3/0085* (2013.01); *H01S 3/0092* (2013.01)

(58) Field of Classification Search
CPC . H01S 3/0085; H01S 3/0092; H01S 3/06754; H01S 3/1301

USPC .................................................. 372/21, 38.01
See application file for complete search history.

(56) References Cited

U.S. PATENT DOCUMENTS 7,529,281 B2 * 5/2009 Leonardo et al. ............ 372/22
2008/0013163 A1 1/2008 Leonardo et al.

FOREIGN PATENT DOCUMENTS

JP    B2-4232130    3/2009
JP    A-2009-294580  12/2009
(Continued)

OTHER PUBLICATIONS

Japanese Office Action issued in Japanese Patent Application No. 2012-556941 mailed Apr. 1, 2014 (with translation).
(Continued)

*Primary Examiner* — Yuanda Zhang
*Assistant Examiner* — Michael Carter
(74) *Attorney, Agent, or Firm* — Oliff PLC

(57) ABSTRACT

A laser device includes: a signal light source that outputs seed light; an electro-optic modulator that chops a portion of the seed light outputted from the signal light source and outputs signal light; an optical amplifier that amplifies the signal light outputted from the electro-optic modulator; a wavelength conversion optical element that wavelength converts the signal light amplified by the optical amplifier; a converted light detector that detects the signal light that has been wavelength converted by the wavelength conversion optical element; and an EU control unit that controls the operation of the electro-optic modulator, wherein the EU control unit is adapted, in the state in which the seed light is being outputted, to adjust bias voltage of the electro-optic modulator on the basis of the applied voltage when the intensity of the signal light after wavelength conversion detected by the converted light detector becomes substantially maximum.

6 Claims, 4 Drawing Sheets

(51) Int. Cl.
*H01S 3/067* (2006.01)
*H01S 3/13* (2006.01)
*H01S 3/00* (2006.01)

(56) References Cited

FOREIGN PATENT DOCUMENTS

| JP | A-2009-544049 | 12/2009 |
| JP | A-2010-238684 | 10/2010 |
| WO | WO 02/095486 A1 | 11/2002 |

OTHER PUBLICATIONS

International Search Report issued in International Application No. PCT/JP2012/053134 dated Mar. 6, 2012.
Sep. 24, 2014 Office Action issued in Japanese Patent Application No. 2012-556941 (with translation).
Mar. 6, 2012 Written Opinion issued in International Application No. PCT/JP2012/053134 (with translation).

* cited by examiner (a)

(b)

METHOD FOR ADJUSTING ELECTRO-OPTIC MODULATOR IN LASER DEVICE, AND LASER DEVICE

TECHNICAL FIELD

The present invention relates to a laser device that amplifies, wavelength converts, and outputs pulse light that has been chopped by an electro-optic modulator, and to a method for adjusting an electro-optic modulator in such a laser device.

BACKGROUND ART

A laser device that amplifies pulse light that has been chopped by an electro-optic modulator and then wavelength converts and outputs it is known as being an appropriate light source for a microscope, a shape measurement device, an exposure device or the like (refer to Patent Document #1). An electro-optic modulator (EOM: Electro-Optic Modulator) is an optical modulator that utilizes the electro-optic effect of a ferroelectric material such as $LiNbO_3$ (lithium niobate) to modulate and output the phase and amplitude and so on of input light with an electrical signal. An EOM of the Mach-Zender type is widely used as an intensity modulator that modulates the amplitude of the input light, in other words its intensity.

An EOM of the Mach-Zender type is constructed to change the refractive indexes of two optical paths that constitute a Mach-Zender interferometer, so that a phase difference between the light beams propagated along these optical paths is generated, and thus the intensity of the output light is changed. In other words, it is possible to perform high speed ON/OFF control of the light incident upon the electro-optic modulator by controlling the voltages applied to these two optical paths: for example, it is possible to make a structure that outputs pulse light by chopping around 1 nsec from seed light whose ON period is around 10 nsec (refer to Patent Document #2).

CITATION LIST

Patent Literature

Patent Document #1: Japanese Patent No. 4,232,130;
Patent Document #2: Re-publication of PCT International Publication No. WO2002/095486.

SUMMARY OF THE INVENTION

Technical Problem

With an electro-optic modulator of the type in which ON/OFF control of the incident light is performed as described above, it is necessary to control the bias voltage for putting the modulator into the state in which no incident light is emitted (i.e. into the OFF state). For example, with an electro-optic modulator that employs interference, such as a Mach-Zender type optical modulator, it is necessary to control the bias voltage in order to keep the optical path length difference of the two optical paths that make up the interferometer constant. Since the bias voltage that keeps the optical path length difference constant changes over time, it is necessary to perform appropriate adjustment of the bias voltage in order to keep the extinction ratio high.

Due to this, in the prior art, a bias adjustment task has been periodically performed in which, while the pulse light outputted from the electro-optic modulator is detected with a high speed detector and its pulse waveform is observed with a oscilloscope or the like, the bias voltage is adjusted so that the extinction ratio is maximum. However there has been a demand for improvement, since a bias adjustment task such as described above is complicated and troublesome.

The present invention has been conceived in consideration of the problems detailed above, and its object is to provide a means that makes it unnecessary to perform the complicated task of adjusting the bias of an electro-optic modulator.

Solution to Problems

According to the first aspect of the present invention, the method for adjusting an electro-optic modulator in a laser device comprising a signal light source that outputs seed light, the electro-optic modulator that chops a portion of the seed light outputted from the signal light source and outputs signal light in pulse form, an optical amplifier that amplifies the signal light outputted from the electro-optic modulator, and a wavelength conversion optical element that wavelength converts the signal light amplified by the optical amplifier, the method comprises: detecting by a converted light detector the signal light that has been wavelength converted by the wavelength conversion optical element in the state in which the seed light is outputted in the laser device, and adjusting bias voltage of the electro-optic modulator on the basis of the applied voltage when the intensity of the signal light after wavelength conversion detected by the converted light detector becomes substantially maximum in the laser device.

According to the second aspect of the present invention, a laser device comprises: a signal light source that outputs seed light; an electro-optic modulator that chops a portion of the seed light outputted from the signal light source and outputs signal light; an optical amplifier that amplifies the signal light outputted from the electro-optic modulator; a wavelength conversion optical element that wavelength converts the signal light amplified by the optical amplifier; a converted light detector that detects the signal light that has been wavelength converted by the wavelength conversion optical element; and an EO control unit that controls the operation of the electro-optic modulator, wherein the EO control unit is adapted, in the state in which the seed light is being outputted, to adjust bias voltage of the electro-optic modulator on the basis of the applied voltage when the intensity of the signal light after wavelength conversion detected by the converted light detector becomes substantially maximum.

It should be understood that, it is preferred that the electro-optic modulator is an optical modulator of the Mach-Zender type. Moreover, it is preferred that the EO control unit is adapted to adjust the bias voltage of the electro-optic modulator on the basis of the applied voltage when, in the state in which the seed light is being outputted, the average power of the signal light after wavelength conversion, as detected by the converted light detector over an interval that is longer than the period at which the signal light is chopped by the electro-optic modulator, becomes substantially maximum.

Advantageous Effect of the Invention

In the present invention, change of the wavelength conversion efficiency of the wavelength conversion optical element is taken advantage of for adjustment of the bias voltage of the electro-optic modulator. When the bias voltage of the electro-optic modulator deviates from the optimum value, the waveform of the pulses outputted from the amplifier deforms or the ON/OFF S/N ratio deteriorates or the like, and the wavelength conversion efficiency of the wavelength conversion optical element drops. From this perspective, it is possible to optimize the bias voltage of the electro-optic modulator in a simple and easy manner, without using a high speed detector or an oscilloscope or the like, by adjusting the bias voltage of the electro-optic modulator on the basis of the applied voltage when, in the state in which the seed light is being outputted, the intensity of the signal light after wavelength conversion generated by the wavelength conversion optical element attains a maximum.

Thus, with the method for adjusting an electro-optic modulator according to the first aspect of the present invention, it is possible to provide a bias adjustment technique with which the complicated and troublesome task of adjusting the bias of the electro-optic modulator is improved, and with which simple and easy optimization is possible.

Moreover, with the laser device according to the second aspect of the present invention, it is possible to eliminate the complicated and troublesome task of adjusting the bias of the electro-optic modulator, and it is possible to provide a laser device whose extinction ratio is high and that outputs clean short pulses of light.

BRIEF DESCRIPTION OF DRAWINGS

FIG. 4(a) shows the situation when the bias voltage applied to the electro-optic modulator is different from the optimum bias voltage, and FIG. 4(b) shows the situation when the bias voltage has been adjusted to the optimum bias voltage.

DESCRIPTION OF EMBODIMENTS

Figure 1:
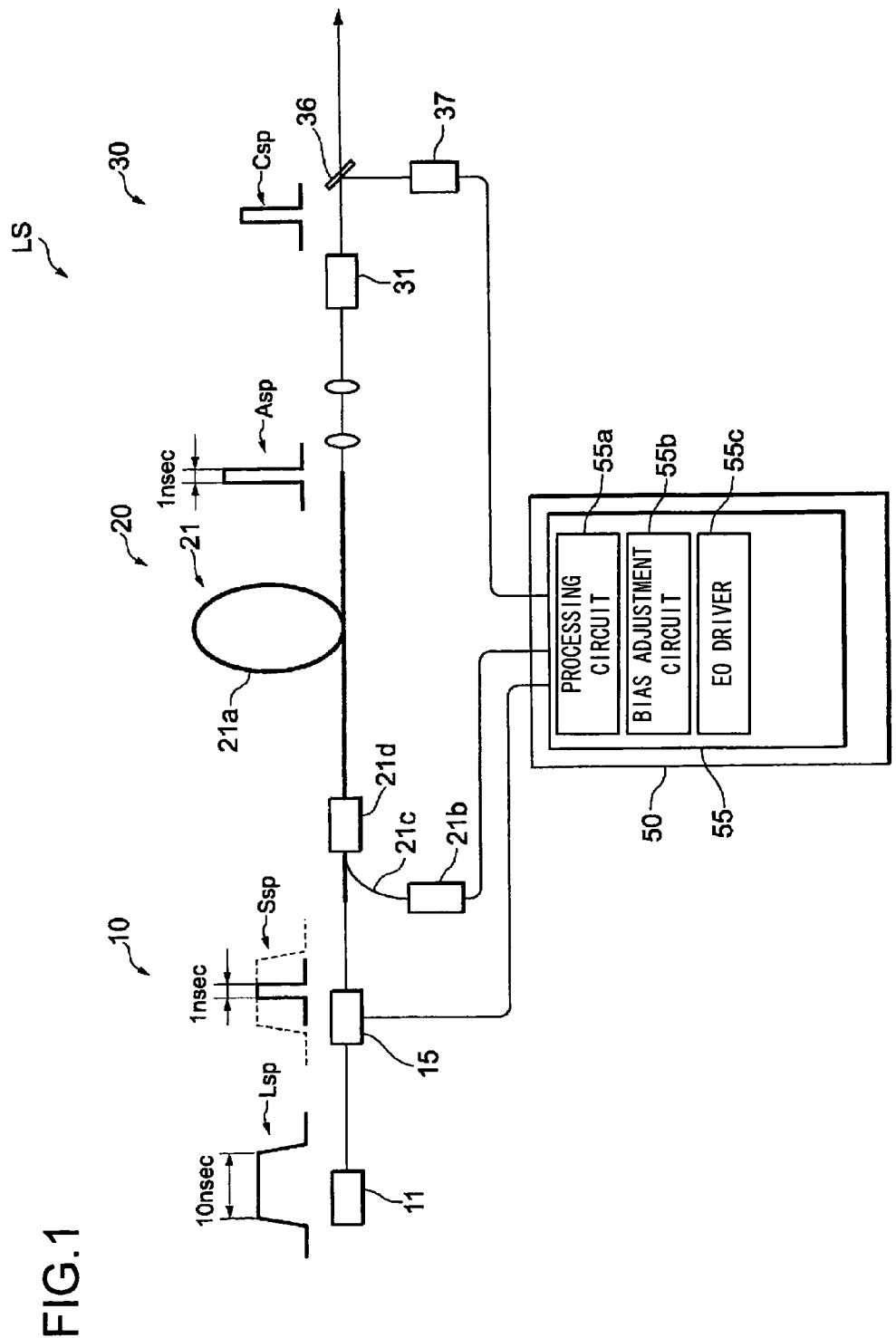
FIG. 1 is an overall structural diagram showing, as an example, a laser device to which the present invention is applied.

In the following, an embodiment of the present invention will be explained with reference to the drawings. An overall structural diagram of a laser device LS to which the present invention is applied is shown in FIG. 1. The laser device LS comprises a signal light output unit 10 that outputs signal light, an amplification unit 20 that amplifies and emits the signal light outputted from the signal light output unit, a wavelength conversion unit 30 that wavelength converts and outputs the amplified light outputted from the amplification unit, and a control device 50 that controls these operations.

The signal light output unit 10 mainly comprises a signal light source 11 that generates seed light, and an electro-optic modulator (EOM) 15 that chops and outputs a portion of the seed light emitted from the signal light source 11. According to the application and the function of the laser device LS, the signal light source 11 may employ a light source on an appropriate wavelength band. Here, an example is shown of a structure of this type employing a DFB semiconductor laser that can output light at the wavelength of 1064 nm. By controlling its pump current, a DFB semiconductor laser can be made to execute CW or pulse oscillation, and moreover, by controlling the temperature, it can be made to emit seed light of a single wavelength that has been narrowed down to a narrowband in a predetermined wavelength range.

The electro-optic modulator 15 outputs signal light in pulse form by chopping a portion of the seed light emitted from the signal light source 11. The electro-optic modulator 15 in this structural example is a Mach-Zender type optical modulator, and its operation is controlled by an EO control unit 55 provided to the control device 50. The signal light chopped by the electro-optic modulator 15 and outputted from the signal light output unit 10 is incident upon the amplification unit 20, and is inputted to the optical fiber amplifier 21.

The amplification unit 20 principally comprises a fiber optic amplifier 21 that amplifies the signal light outputted from the signal light output unit 10. An ytterbium doped optical fiber amplifier (YDFA) having gain in the 1000 to 1100 nm wavelength band may appropriately be used as an optical fiber amplifier for amplifying signal light of wavelength 1064 nm. Such an optical fiber amplifier 21 comprises an optical fiber 21a for amplification having ytterbium (Yb) doped into its core, a pump light source 21b that pumps the Yb, an optical fiber for conduction 21c that conducts the pump light emitted from the pump light source 21b to the optical fiber 21a for amplification, a pump combiner 21d that couples the optical fiber for conduction to the optical fiber for amplification, and so on.

The wavelength conversion unit 30 wavelength converts and outputs the signal light after amplification outputted from the amplification unit 20. The wavelength conversion unit 30 may have a concrete structure that is appropriate according to the application and function and so on of the system in which this laser device LS is used: for example, it may be built to output deep ultraviolet light of wavelength 190 to 200 nm (for example, refer to Japanese Laid-Open Patent Publication 2004-86193 and to Japanese Laid-Open Patent Publication 2010-93210). Here, a case will be explained in which the wavelength conversion unit 30 is provided with a wavelength conversion optical element 31 that performs generation of the second harmonic of the signal light.

For example, a PPLN (Periodically Poled LN) crystal may be appropriately used as the wavelength conversion optical element 31 that performs generation of the second harmonic of the signal light of wavelength 1064 nm (that is the fundamental wave). It should be understood that it would also be acceptable to use a PPLT (Periodically Poled LT) crystal, an LBO ($LiB_3O_5$) crystal, a BBO ($\beta$-$BaB_2O_4$) crystal or the like.

The control device 50 is a control unit that controls the overall operation of the laser device, including the signal light source 11, the electro-optic modulator 15, and the optical fiber amplifier 21 (i.e. the pump light source 21b). A storage unit that stores a control program for the laser device LS and parameters of various types, a calculation processing unit that executes calculation processing on the basis of this control program, and a driver or the like that drives various sections such as the EO control unit 55 shown as an example, are provided to the control device 50, but the details thereof are not shown in the figure. Moreover, a keyboard and switches of various types that are actuated by the operator of the laser device, and a display panel and various lamps and so on that display the state of execution of the control program and alarms of various types and so on, are provided upon an operation panel.

In the structure of this aspect, the control device 50 repeatedly emits seed light Lsp in the form of long pulses of frequency around 2 MHz and ON interval of 10 nsec, these are then chopped by the electro-optic modulator 15 so that short pulses of signal light Ssp are generated with ON interval of 1 nsec, and these are outputted from the laser light generation unit 10. And control is performed to amplify the signal light Ssp outputted from the signal light generation unit 10 with the optical fiber amplifier of the amplification unit 20, and to output the amplified signal light Asp (hereinafter for convenience termed the "amplified light").

Since the electro-optic modulator 15 is an optical intensity modulator that utilizes interference, it is necessary to set a bias voltage so that the seed light Lsp does not leak out when the electro-optic modulator 15 is off. In particular, with a Mach-Zender type electro-optic modulator, the bias voltage for keeping constant the optical path length difference between the two optical paths that constitute the interferometer (i.e. for keeping their phase difference equal to half a wavelength) changes over time, and the extinction ratio changes. Due to this, it is necessary to adjust the bias voltage appropriately in order to maintain a high extinction ratio.

With this laser device LS, change of the wavelength conversion efficiency of the wavelength conversion optical element 31, in more concrete terms change of the intensity of pulsed light Csp at wavelength 532 nm generated by the wavelength conversion optical element 31 (hereinafter for convenience termed the "converted light") is taken advantage of for adjusting the bias voltage of the electro-optic modulator 15. As is per se well known, the wavelength conversion efficiency of a non-linear optical crystal is proportional to the incident light intensity, and the power of the converted light is proportional to the square of the incident light intensity.

With this laser device LS, a photodetector 37 for detecting the converted light Csp is provided to the emission side of the wavelength conversion optical element 31 (in this specification, this is termed the "converted light detector"), and the EO control unit 55 adjusts the bias voltage of the electro-optic modulator 15 on the basis of the applied voltage when the intensity of the converted light Csp detected by this converted light detector 37 becomes maximum.

In concrete terms, a derivation element 36 such as a partial reflection mirror that reflects a portion (for example around 1%) of light at wavelength 532 nm or a WDM coupler is provided at the emission side of the wavelength conversion optical element 31, and converted light Csp that has been split off by the derivation element 36 is detected by the converted light detector 37. Any type of photodetector may be used for the converted light detector 37, provided that it has detection sensitivity in a wavelength band that includes the 532 nm wavelength, and provided that its time constant is comparatively long (for example, on the order of milliseconds). Detecting the intensity of the converted light with this type of photodetector amounts to detecting the average power of the converted light Csp, since this time constant is a much longer time interval than the period (on the order of nanoseconds) at which the signal light Ssp is chopped by the electro-optic modulator 15. The detection signal from the converted light detector 37 is inputted to the EO control unit 55.

The EO control unit 55 comprises a processing circuit 55a that performs calculation processing, a bias adjustment circuit 55b that adjusts the bias voltage applied to the electro-optic modulator 15 (this being a DC bias voltage), an EO driver 55c that drives the electro-optic modulator 15 to go ON and OFF, and so on. In the state in which the seed light is being outputted, the processing circuit 55a changes the bias voltage applied to the electro-optic modulator 15 with the bias adjustment circuit 55b, and derives the bias voltage (termed the "optimum bias voltage") at which the extinction ratio becomes maximum, on the basis of the applied voltage when the power of the converted light Csp detected by the converted light detector 37 substantially becomes maximum. And the bias adjustment circuit 55b adjusts and sets the bias voltage applied to the electro-optic modulator 15 on the basis of the optimum bias voltage thus derived by the processing circuit 55a.

Figure 2:
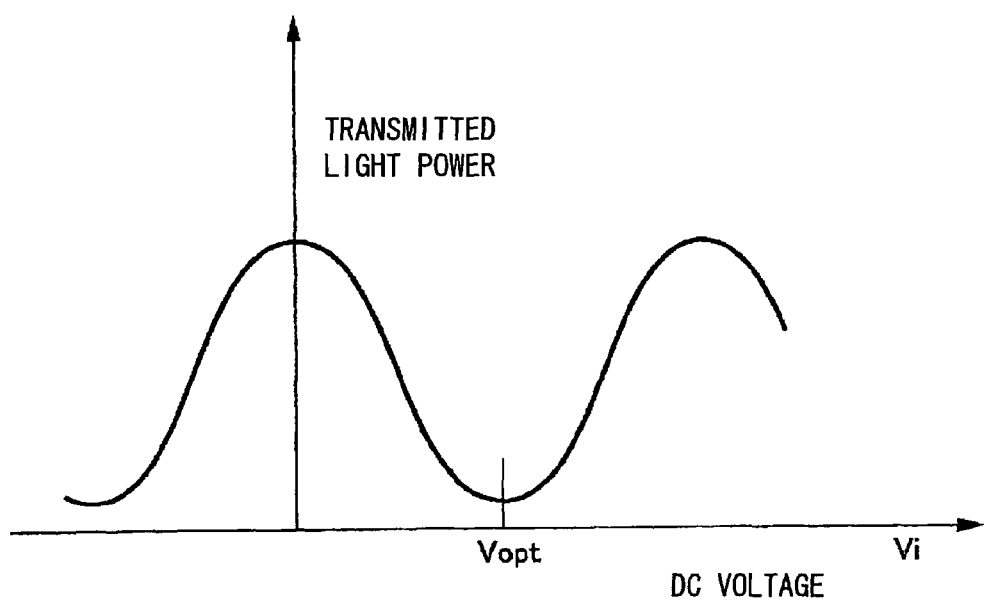
FIG. 2 is a graph showing a relationship between the voltage applied to an electro-optic modulator and the intensity of the transmitted light passing through the electro-optic modulator.

FIG. 2 shows the relationship between the DC voltage Vi applied to the electro-optic modulator 15 and the intensity of the light in the 1 μm wavelength band that passes through the electro-optic modulator 15. As shown in the figure, the intensity of the transmitted light that passes through the electro-optic modulator 15 changes in a sine wave pattern along with increase or decrease of the DC voltage Vi applied to the electro-optic modulator 15. The optimum value of the DC bias voltage when performing pulse chopping is the voltage Vopt at which the transmittance of the electro-optic modulator 15 becomes minimum.

Figure 3:
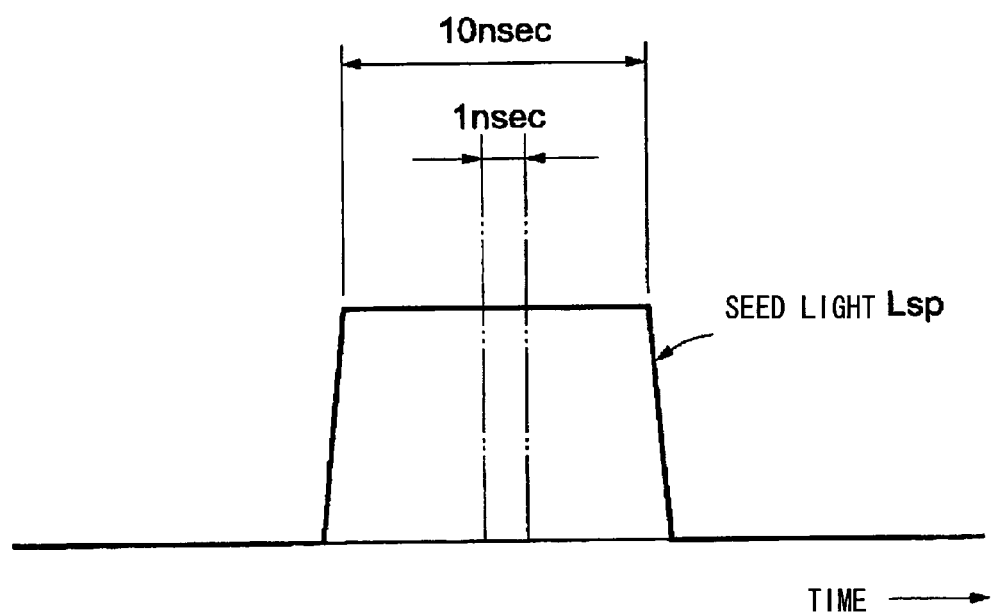
FIG. 3 is a schematic figure showing the way in which seed light incident upon the electro-optic modulator is chopped.
Figure 4:
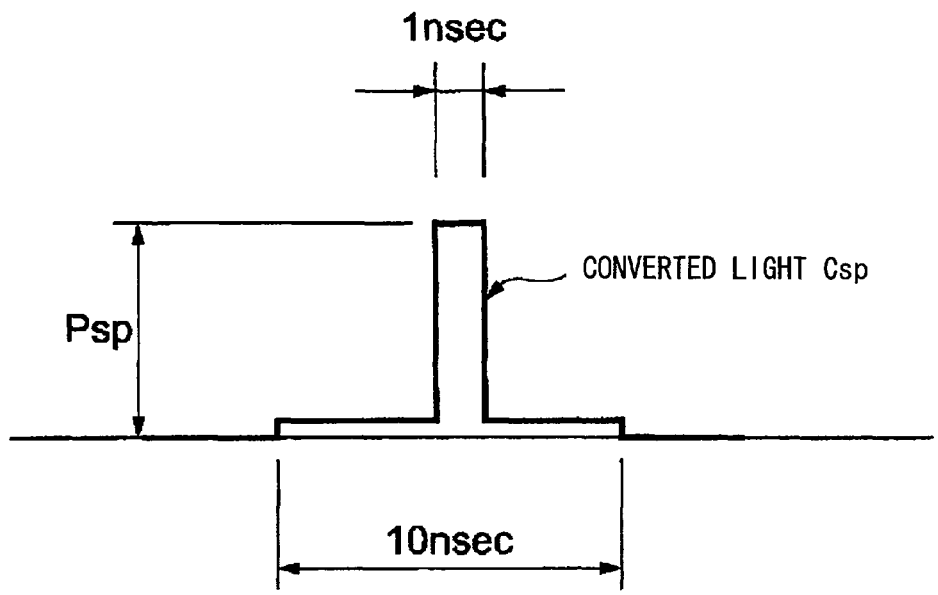
FIG. 4 is a schematic figure showing two forms of the amplified light chopped by and emitted from the electro-optic modulator.
Figure 4:
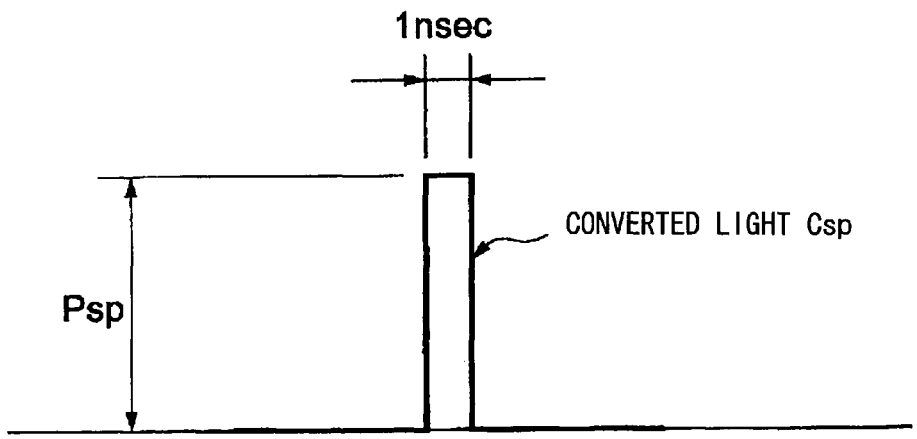

In FIG. 3 the seed light Lsp incident upon the electro-optic modulator 15 and the way in which a portion of this seed light Lsp is chopped by the electro-optic modulator 15 are shown, and in FIG. 4 two forms of the converted light Csp emitted from the wavelength conversion optical element 31 are shown. In both these figures, time is shown along the horizontal axis, while light intensity is shown along the vertical axis. Furthermore, FIG. 4(a) shows the situation when the bias voltage applied to the electro-optic modulator is different from the optimum bias voltage Vopt, while FIG. 4(b) shows the situation when the bias voltage has been adjusted to the optimum bias voltage Vopt. It should be understood that the waveform of the converted light Csp is shown as exaggerated in FIG. 4, in order to simplify understanding of the difference between when the bias voltage is adjusted and set to the optimum bias voltage Vopt, and when this is not the case.

As shown in FIG. 3, the seed light Lsp incident upon the electro-optic modulator 15 from the signal light source 11 has the form of long pulses of frequency around 2 MHz and whose ON interval is around 10 nsec, and, in the state in which the bias voltage applied to the electro-optic modulator 15 has been adjusted and set to the optimum bias voltage Vopt (i.e. in a state in which the extinction ratio is high), around 1 nsec is chopped out from this seed light, so that signal light in the form of short rectangular pulses Ssp is outputted from the electro-optic modulator 15. However, in a state in which the bias voltage applied to the electro-optic modulator 15 has deviated from the optimum bias voltage Vopt, the seed light Lsp cannot be adequately cut off when the electro-optic modulator 15 is in the OFF state, and the signal light outputted from the electro-optic modulator at this time has a hat-shaped waveform in which seed light Lsp leaks out on both sides of the short pulse portions of 1 nsec, i.e. before and after them.

Due to this, in this state in which the bias voltage applied to the electro-optic modulator 15 has deviated from the optimum bias voltage Vopt, also the seed light that has leaked out during the OFF state of the electro-optic modulator 15 is amplified and wavelength converted, and, as shown in FIG. 4(a), the converted light Csp of wavelength 532 run that is outputted from the wavelength conversion optical element 31 has a hat-shaped waveform in which brim portions are present on both sides of the short pulse portions of 1 nsec, i.e. before and after them. At this time, in the optical fiber amplifier 21, the gain is consumed by amplification of these brim portions, so that the peak power of the short pulse portions is reduced. As previously described, the wavelength conversion efficiency of the wavelength conversion optical element is proportional to the incident light intensity, and the power of the converted light Csp is proportional to the square of the incident light intensity. Due to this, the pulse waveform of the converted light Csp at wavelength of 532 nm outputted from the wavelength conversion optical element 31 is degraded into a hat-shape, and moreover its peak power Psp (and its average power) become low.

On the other hand, in the state in which the bias voltage is adjusted and set to the optimum bias voltage Vopt, when the electro-optic modulator 15 is in the OFF state, there are almost no brim portions because the seed light is adequately cut off, and, as shown in FIG. 4(b), the converted light Csp of wavelength 532 nm that is outputted from the wavelength conversion optical element 31 has a clean and short rectangular pulse waveform that consists only of short pulse portions of 1 nsec. At this time, the peak power of the amplified light incident upon the wavelength conversion optical element 31 is high because, in the optical fiber amplifier 21, the gain effectively contributes to amplification of the short pulse portions. Due to this, the peak power Psp (and the average power) of the converted light Csp of wavelength 532 nm outputted from the wavelength conversion optical element 31 are high, and this light is formed as clean rectangular pulses having no brim portions.

By doing this, it is possible to set the bias voltage of the electro-optic modulator 15 to the optimum bias voltage Vopt by adjusting the bias voltage so that the power of the converted light Csp detected by the converted light detector 37 attains its maximum value. And thereby it is possible to perform bias adjustment of the electro-optic modulator 15 as appropriate, and to set it to a state in which no leakage light is generated.

It is possible to provide various types of structure with which bias adjustment of the electro-optic modulator 15 can be performed appropriately according to the state of change of the bias voltage of the electro-optic modulator 15 that is used; for example, it is possible to arrange for this bias adjustment to be performed when the laser device LS starts up or at predetermined intervals during use, or for bias adjustment to be executed on the basis of an adjustment command issued by the operator.

Thus, according to the adjustment method for an electro-optic modulator and the laser device LS explained above, it is possible to optimize the bias voltage of the electro-optic modulator 15 in a simple and easy manner, without using any high speed detector or oscilloscope or the like. And thus it is possible to provide a laser device that outputs short pulses of amplified light having a clean waveform, and for which the temporal S/N ratio is high.

While, in the above explanation, by way of example, a structure has been shown in which an ytterbium doped optical fiber amplifier (YDFA) was used as the optical amplifier, it would be acceptable for the wavelength of the signal light or the type of the optical amplifier to be different: for example, it would be possible to employ an erbium doped optical fiber amplifier (EDFA) or an optical amplifier that uses a bulk amplification medium or the like. Moreover, the wavelength conversion unit 30 may have a structure that is appropriate according to the application and function of the system to which the laser device is applied: for example, it may be built to output converted light of wavelength 193 nm.

While various embodiments and variant embodiments have been explained as described above, the present invention is not to be considered as being limited by the details thereof.

The disclosure of the following priority application is herein incorporated by reference:
Japanese Patent Application No. 2011-027884 (filed on Feb. 10, 2011).

The invention claimed is:

1. A method for adjusting an electro-optic modulator in a laser device comprising a signal light source that outputs seed light, the electro-optic modulator that chops a portion of the seed light outputted from the signal light source and outputs signal light in pulse form, an optical amplifier that amplifies the signal light outputted from the electro-optic modulator, and a wavelength conversion optical element that wavelength converts the signal light amplified by the optical amplifier, the method comprising:
   detecting by a converted light detector the signal light that has been wavelength converted by the wavelength conversion optical element in the state in which the seed light is outputted in the laser device; and
   adjusting a bias voltage of the electro-optic modulator on the basis of when the intensity of the signal light after wavelength conversion detected by the converted light detector becomes substantially maximum in the laser device.

2. A laser device, comprising:
   a signal light source that outputs seed light;
   an electro-optic (EO) modulator that chops a portion of the seed light outputted from the signal light source and outputs signal light;
   an optical amplifier that amplifies the signal light outputted from the electro-optic modulator;
   a wavelength conversion optical element that wavelength converts the signal light amplified by the optical amplifier;
   a converted light detector that detects the signal light that has been wavelength converted by the wavelength conversion optical element; and
   an EO control unit that controls the operation of the electro-optic modulator,
   wherein the EO control unit is adapted, in the state in which the seed light is being outputted, to adjust a bias voltage of the electro-optic modulator on the basis of when the intensity of the signal light after wavelength conversion detected by the converted light detector becomes substantially maximum.

3. A laser device according to claim 2, wherein the electro-optic modulator is an optical modulator of the Mach-Zender type.

4. A laser device according to claim 3, wherein the EO control unit is adapted to adjust the bias voltage of the electro-optic modulator on the basis of the applied voltage when, in the state in which the seed light is being outputted, the average power of the signal light after wavelength conversion, as detected by the converted light detector over an interval that is longer than the period at which the signal light is chopped by the electro-optic modulator, becomes substantially maximum.

5. A laser device according to claim 2, wherein the EO control unit is adapted to adjust the bias voltage of the electro-optic modulator on the basis of the applied voltage when, in the state in which the seed light is being outputted, the average power of the signal light after wavelength conversion, as detected by the converted light detector over an interval that is longer than the period at which the signal light is chopped by the electro-optic modulator, becomes substantially maximum.

6. A laser device according to claim 2, wherein the EO control unit is adapted to adjust the bias voltage applied to the electro-optic modulator to an optimum bias voltage derived from the detection of the substantially maximum intensity of the signal light after wavelength conversion.

* * * * *